(12) United States Patent
Liu

(10) Patent No.: US 11,255,434 B2
(45) Date of Patent: *Feb. 22, 2022

(54) ELECTRONIC CIGARETTE

(71) Applicant: Tuanfang Liu, Shenzhen (CN)

(72) Inventor: Tuanfang Liu, Shenzhen (CN)

( * ) Notice: Subject to any disclaimer, the term of this patent is extended or adjusted under 35 U.S.C. 154(b) by 339 days.

This patent is subject to a terminal disclaimer.

(21) Appl. No.: 16/518,953

(22) Filed: Jul. 22, 2019

(65) Prior Publication Data

US 2020/0297037 A1 Sep. 24, 2020

(30) Foreign Application Priority Data

Mar. 20, 2019 (CN) .......................... 201910211786.4
Mar. 20, 2019 (CN) .......................... 201920360622.3

(51) Int. Cl.
*F16J 15/10* (2006.01)
*A24F 1/32* (2006.01)

(52) U.S. Cl.
CPC ............... *F16J 15/102* (2013.01); *A24F 1/32* (2013.01)

(58) Field of Classification Search
None
See application file for complete search history.

(56) References Cited

FOREIGN PATENT DOCUMENTS

CN         105249535       *  1/2016
WO    WO-2016119145 A1 *  8/2016   ............. A24F 40/60

* cited by examiner

*Primary Examiner* — Timothy Kennedy
*Assistant Examiner* — Guy F Mongelli
(74) *Attorney, Agent, or Firm* — Matthias Scholl P.C.; Matthias Scholl

(57) ABSTRACT

An electronic cigarette, including an atomization assembly and a battery assembly. The atomization assembly includes a mouthpiece, a glass tube, a first seal ring sealing the glass tube, an atomizer, and an atomization core. The atomization core comprises a silica seal, a silica vent, a ceramic core, a pedestal, a first insulation ring, a heating tube, and a first joint. The battery assembly includes a second joint, a second insulation ring, a threaded ring, a first elastic electrode part, a spring, a second elastic electrode part, a third elastic electrode part, a third insulation ring, a magnet, a silica sleeve, a steel tube, a compression ring, a control plate, a battery core, a first inner casing, a first outer casing, a middle casing, a first silica gasket, a first button, a transparent film, a second button, a second silica gasket, a second outer casing, and a second inner casing.

4 Claims, 5 Drawing Sheets

ELECTRONIC CIGARETTE

CROSS-REFERENCE TO RELATED APPLICATIONS

Pursuant to 35 U.S.C. § 119 and the Paris Convention Treaty, this application claims foreign priority to Chinese Patent Application No. 201910211786.4 filed Mar. 20, 2019, and to Chinese Patent Application No. 201920360622.3 filed Mar. 20, 2019. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, Mass. 02142.

BACKGROUND

The disclosure relates to an electronic cigarette. An electronic cigarette or e-cigarette is a handheld battery-powered vaporizer that simulates smoking by providing some of the behavioral aspects of smoking, including the hand-to-mouth action of smoking, but without burning tobacco. Using an e-cigarette is known as "vaping" and the user is referred to as a "vaper." Instead of cigarette smoke, the user inhales an aerosol of atomized nicotine-containing e-liquid, commonly called vapor.

SUMMARY

The disclosure provides an electronic cigarette.

Provided is an electronic cigarette, comprising an atomization assembly and a battery assembly. The atomization assembly is disposed in the battery assembly. The atomization assembly comprises a mouthpiece, a glass tube, a first seal ring sealing the glass tube, an atomizer comprising a head and a base, a second seal ring sealing the head, a vent tube, a third seal ring sealing the base of the atomizer, and an atomization core, the atomization core comprising a silica seal, a silica vent, a ceramic core, a pedestal, a first insulation ring, a heating tube, and a first joint. The first seal ring is disposed in the mouthpiece; the second seal ring is sheathed on the head; the head is disposed on the vent tube; the vent tube is disposed on the base; the third seal ring is sheathed on the base; the ceramic core and the silica vent are disposed on the pedestal; the silica seal is disposed on the ceramic core; the first insulation ring is disposed in the pedestal; the heating tube is disposed on the first joint; the first joint is embedded in the first insulation ring; the atomization core is embedded in the base; the glass tube is sheathed on the base, and the mouthpiece 1 is in threaded connection to the head.

The battery assembly comprises a second joint, a second insulation ring, a threaded ring, a first elastic electrode part, a spring, a second elastic electrode part, a third elastic electrode part, a third insulation ring, a magnet, a silica sleeve, a steel tube, a compression ring, a control plate, a battery core, a first inner casing, a first outer casing, a middle casing, a first silica gasket, a first button, a transparent film, a second button, a second silica gasket, a second outer casing, and a second inner casing. The middle casing is disposed in the first outer casing; the first inner casing is embedded in the first outer casing; the second insulation ring is disposed in the threaded ring; the second joint is disposed in the second insulation ring; the spring is sheathed on the first elastic electrode part; the first elastic electrode part and the third elastic electrode part are embedded in the second elastic electrode part; the second elastic electrode part is disposed in the third insulation ring; the third insulation ring is disposed in the magnet; the magnet is in threaded connection to the threaded ring and is disposed in the steel tube; the steel tube is supported by the compression ring; the control plate comprises a pneumatic switch which is disposed in the silica sleeve; the silica sleeve is disposed in the compression ring; positive and negative poles of the control plate are connected to positive and negative poles of the battery core; the control plate, the battery core and the steel tube are disposed in the first outer casing; the middle casing comprises a first groove and a second groove; the first silica gasket and the first button are disposed in the first groove, and the second button and the second silica gasket are disposed in the second groove; the second inner casing is disposed on the second outer casing; and the second inner casing and the second outer casing are fixed on the middle casing.

The head of the atomizer can comprise a plurality of gear grooves or knurling grooves.

The heating tube of the atomization assembly can communicate with the second joint, and is directly connected to the mouthpiece and the pneumatic switch of the control plate.

The atomization assembly can be disposed in the steel tube and fixed on the threaded ring.

Advantages of the electronic cigarette according to embodiments of the disclosure are summarized as follows:

1. The electronic cigarette is compact and easy to carry.
2. The head of the atomizer comprises a plurality of gear grooves or knurling grooves; the bubbles produced by the e-liquid can release from the gear grooves or knurling grooves thus preventing the blockage of the inlet of the e-liquid.
3. The thermal vapor flow can enter the heating tube to drive the pneumatic switch to work and heat the ceramic core, so that the e-liquid in the atomization assembly is heated to a free state, thus preventing the blockage of the conveying pipe by the condensed e-liquid.

DETAILED DESCRIPTIONS

To further illustrate, embodiments detailing an electronic cigarette are described below. It should be noted that the following embodiments are intended to describe and not to limit the disclosure.

Figure 1:
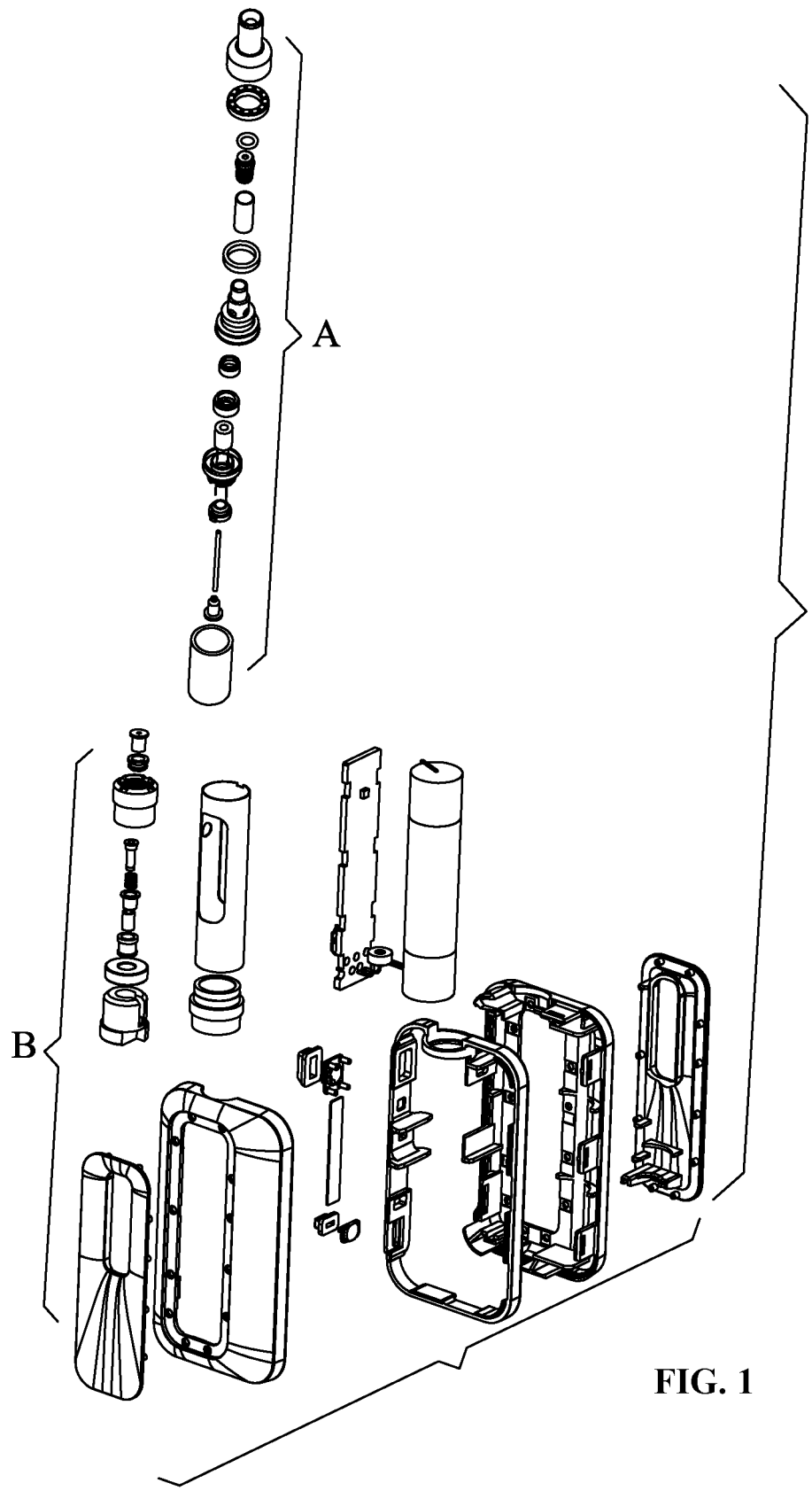
FIG. 1 is a schematic view of an electronic cigarette according to one embodiment of the disclosure.
Figure 2:
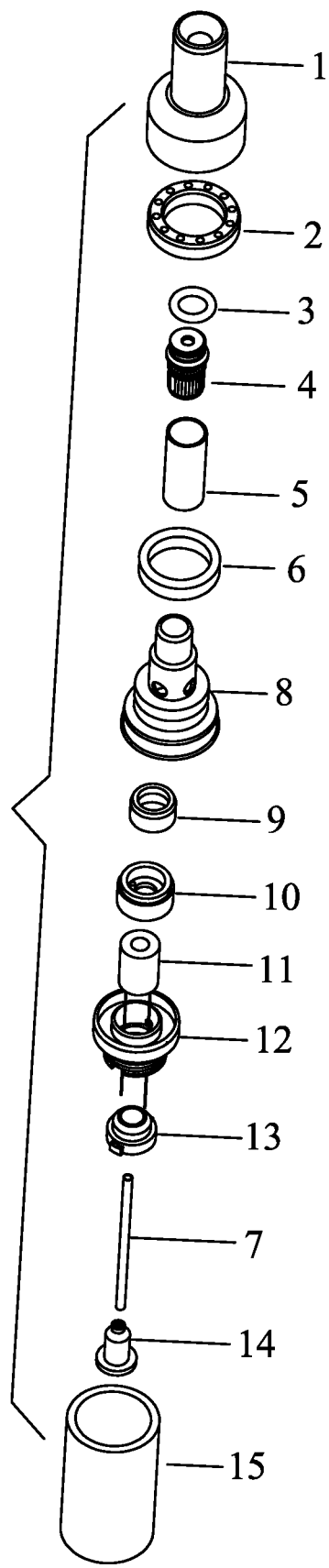
FIG. 2 is an exploded view of an atomization assembly of an electronic cigarette according to one embodiment of the disclosure.
Figure 3:
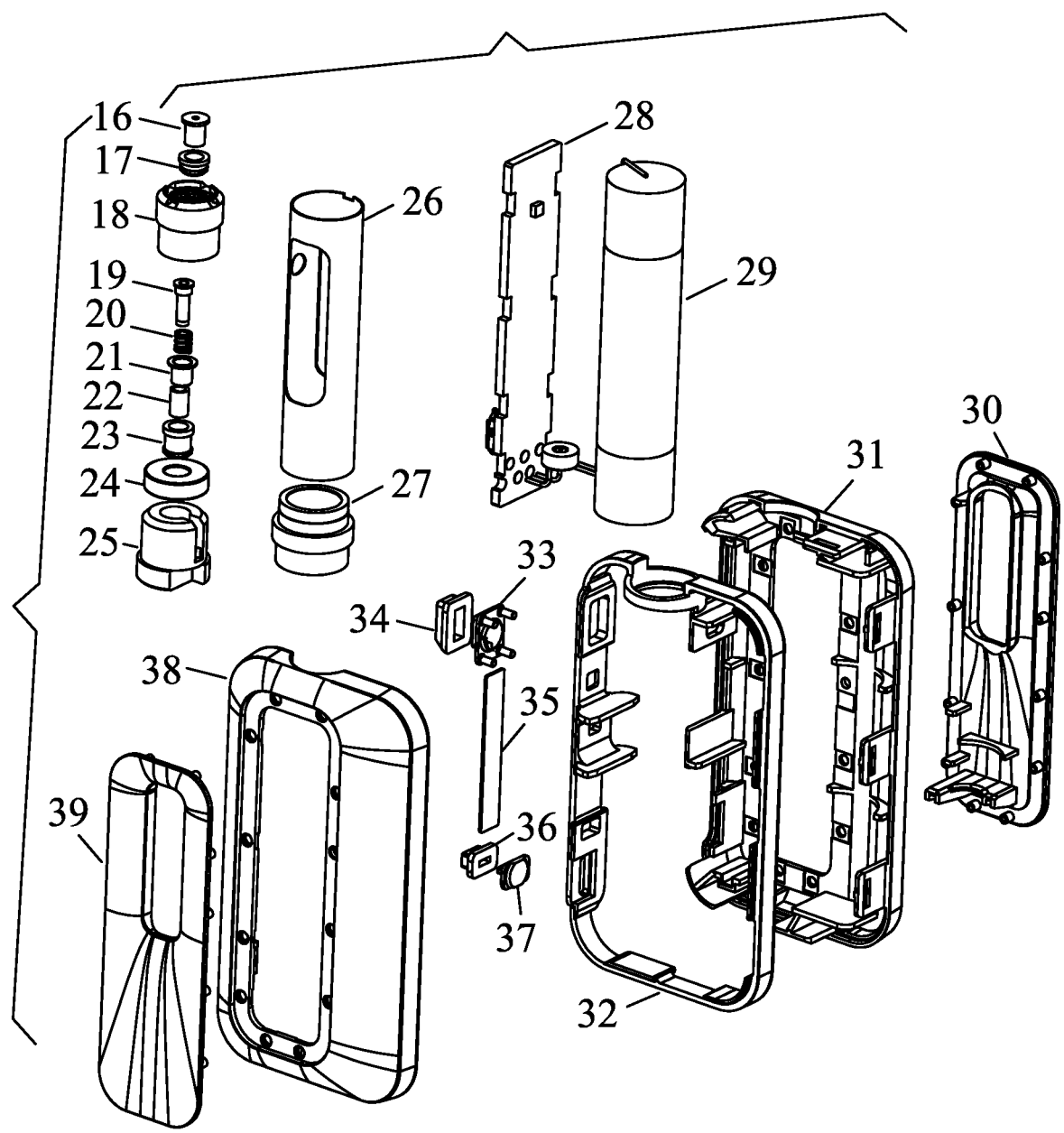
FIG. 3 is an exploded view of a battery assembly of an electronic cigarette according to one embodiment of the disclosure.
Figure 4:
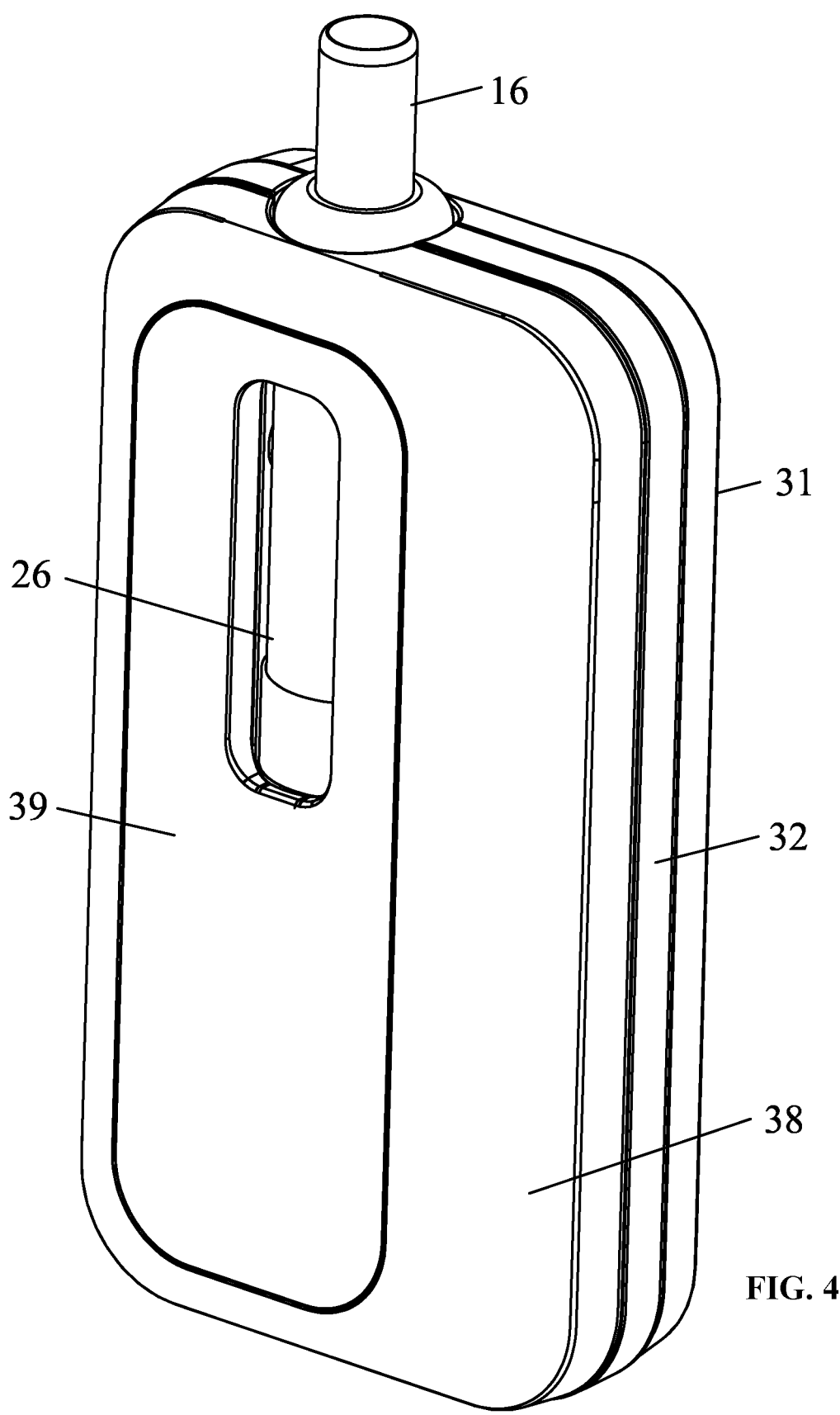
FIG. 4 is a stereogram of an electronic cigarette according to one embodiment of the disclosure.
Figure 5:
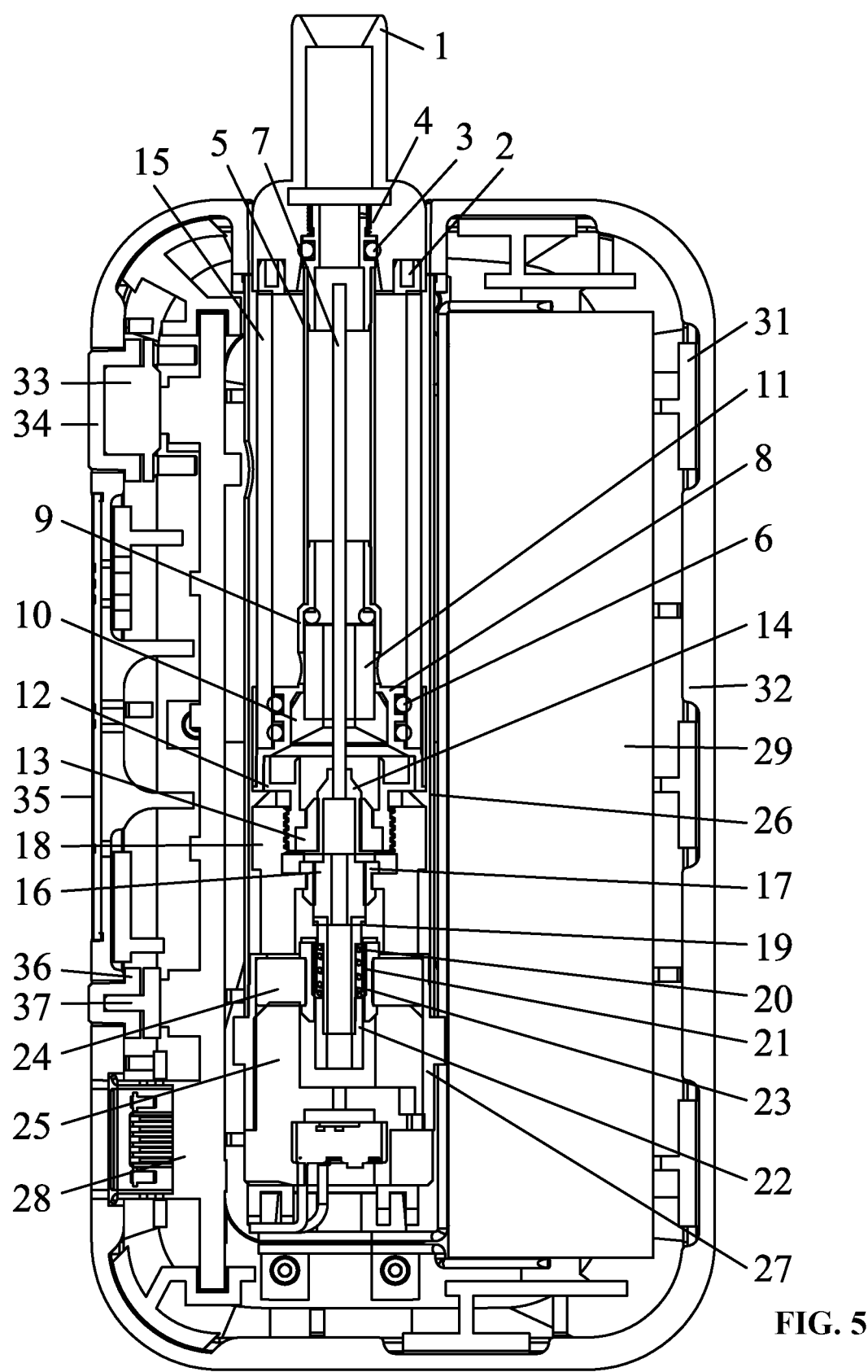
FIG. 5 is a sectional view of an electronic cigarette according to one embodiment of the disclosure.

As shown in FIGS. 1-5, the disclosure provides an electronic cigarette comprising an atomization assembly A and a battery assembly B. The atomization assembly is disposed in the battery assembly. The atomization assembly A comprises a mouthpiece 1, a glass tube 15, a first seal ring 2 sealing the glass tube, an atomizer comprising a head 4 and a base 8, a second seal ring 3 sealing the head, a vent tube 5, a third seal ring 6 sealing the base of the atomizer, and an atomization core, the atomization core comprising a silica seal 9, a silica vent 10, a ceramic core 11, a pedestal 12, a first insulation ring 13, a heating tube 7, and a first joint 14. The first seal ring 2 is disposed in the mouthpiece 1; the second seal ring 3 is sheathed on the head 4; the head 4 is disposed on the vent tube 5; the vent tube 5 is disposed on the base 8; the third seal ring 6 is sheathed on the base 8; the ceramic core 11 and the silica vent 10 are disposed on the pedestal 12; the silica seal 9 is disposed on the ceramic core 11; the first insulation ring 13 is disposed in the pedestal 12; the heating tube 7 is disposed on the first joint 14; the first joint 14 is embedded in the first insulation ring 13; the atomization core is embedded in the base 8; the glass tube 15 is sheathed on the base 8, and the mouthpiece 1 is in threaded connection to the head 4.

Open the mouthpiece, the e-liquid can be injected in the atomizer through the opening of the glass tube 15. Thereafter, the e-liquid penetrates from the inlet of the base 8 of the atomizer into the ceramic core 11. During the penetration, the e-liquid will produce bubbles. The bubbles can release from the gear grooves or knurling grooves thus preventing the blockage of the inlet of the e-liquid.

The heating tube 7 of the atomization assembly communicates with the second joint 16, and is directly connected to the mouthpiece 1 and the pneumatic switch of the control plate 28. During smoking, the thermal vapor flow can enter the heating tube to drive the pneumatic switch to work and heat the ceramic core, so that the e-liquid in the atomization assembly is heated to a free state, thus preventing the blockage of the conveying pipe by the condensed e-liquid.

The battery assembly comprises a second joint 16, a second insulation ring 17, a threaded ring 18, a first elastic electrode part 19, a spring 20, a second elastic electrode part 21, a third elastic electrode part 22, a third insulation ring 23, a magnet 24, a silica sleeve 25, a steel tube 26, a compression ring 27, a control plate 28, a battery core 29, a first inner casing 30, a first outer casing 31, a middle casing 32, a first silica gasket 33, a first button 34, a transparent film 35, a second button 36, a second silica gasket 37, a second outer casing 38, a second inner casing 39. The middle casing 32 is disposed in the first outer casing 31; the first inner casing 30 is embedded in the first outer casing 31; the second insulation ring 17 is disposed in the threaded ring 18; the second joint 16 is disposed in the second insulation ring 17; the spring 20 is sheathed on the first elastic electrode part 19; the first elastic electrode part 19 and the third elastic electrode part 22 are embedded in the second elastic electrode part 21; the second elastic electrode part 21 is disposed in the third insulation ring 23; the third insulation ring 23 is disposed in the magnet 24; the magnet 24 is in threaded connection to the threaded ring 18 and is disposed in the steel tube 26; the steel tube 26 is supported by the compression ring 27; the control plate 28 comprises a pneumatic switch which is disposed in the silica sleeve 25; the silica sleeve 25 is disposed in the compression ring 27; positive and negative poles of the control plate 28 are connected to positive and negative poles of the battery core 29; the control plate 28, the battery core 29 and the steel tube are disposed in the first outer casing 31; the middle casing 32 comprises a first groove and a second groove; the first silica gasket 33 and the first button 34 are disposed in the first groove, and the second button 36 and the second silica gasket 37 are disposed in the second groove; the second inner casing 39 is disposed on the second outer casing 38; and the second inner casing 39 and the second outer casing 38 are fixed on the middle casing 32.

The atomization assembly is disposed in the steel tube 26 and is fixed on the threaded ring 18. The electronic cigarette is a three-dimensional square box, compact and easy to carry.

It will be obvious to those skilled in the art that changes and modifications may be made, and therefore, the aim in the appended claims is to cover all such changes and modifications.

What is claimed is:

1. An electronic cigarette, comprising:
   an atomization assembly, the atomization assembly comprising a mouthpiece, a glass tube, a first seal ring sealing the glass tube, an atomizer comprising a head and a base, a second seal ring sealing the head, a vent tube, a third seal ring sealing the base of the atomizer, and an atomization core, the atomization core comprising a silica seal, a silica vent, a ceramic core, a pedestal, a first insulation ring, a heating tube, and a first joint; and
   a battery assembly, the battery assembly comprising a second joint, a second insulation ring, a threaded ring, a first elastic electrode part, a spring, a second elastic electrode part, a third elastic electrode part, a third insulation ring, a magnet, a silica sleeve, a steel tube, a compression ring, a control plate, a battery core, a first inner casing, a first outer casing, a middle casing, a first silica gasket, a first button, a transparent film, a second button, a second silica gasket, a second outer casing, and a second inner casing;
   wherein:
   the atomization assembly is disposed in the battery assembly;
   the first seal ring is disposed in the mouthpiece; the second seal ring is sheathed on the head; the head is disposed on the vent tube; the vent tube is disposed on the base; the third seal ring is sheathed on the base; the ceramic core and the silica vent are disposed on the pedestal; the silica seal is disposed on the ceramic core; the first insulation ring is disposed in the pedestal; the heating tube is disposed on the first joint; the first joint is embedded in the first insulation ring; the atomization core is embedded in the base; the glass tube is sheathed on the base, and the mouthpiece is in threaded connection to the head; and
   the middle casing is disposed in the first outer casing; the first inner casing is embedded in the first outer casing; the second insulation ring is disposed in the threaded ring; the second joint is disposed in the second insulation ring; the spring is sheathed on the first elastic electrode part; the first elastic electrode part and the third elastic electrode part are embedded in the second elastic electrode part; the second elastic electrode part is disposed in the third insulation ring; the third insulation ring is disposed in the magnet; the magnet is in threaded connection to the threaded ring and is disposed in the steel tube; the steel tube is supported by the compression ring; the control plate comprises a pneumatic switch which is disposed in the silica sleeve; the silica sleeve is disposed in the compression ring; positive and negative poles of the control plate are connected to positive and negative poles of the battery core; the control plate, the battery core and the steel tube are disposed in the first outer casing; the middle casing comprises a first groove and a second groove;

the first silica gasket and the first button are disposed in the first groove, and the second button and the second silica gasket are disposed in the second groove; the second inner casing is disposed on the second outer casing; and the second inner casing and the second outer casing are fixed on the middle casing.

2. The electronic cigarette of claim 1, wherein the head of the atomizer comprises a plurality of gear grooves or knurling grooves.

3. The electronic cigarette of claim 1, wherein the heating tube of the atomization assembly communicates with the second joint and is directly connected to the mouthpiece and the pneumatic switch of the control plate.

4. The electronic cigarette of claim 1, wherein the atomization assembly is disposed in the steel tube and is fixed on the threaded ring.

* * * * *